Figure 1:
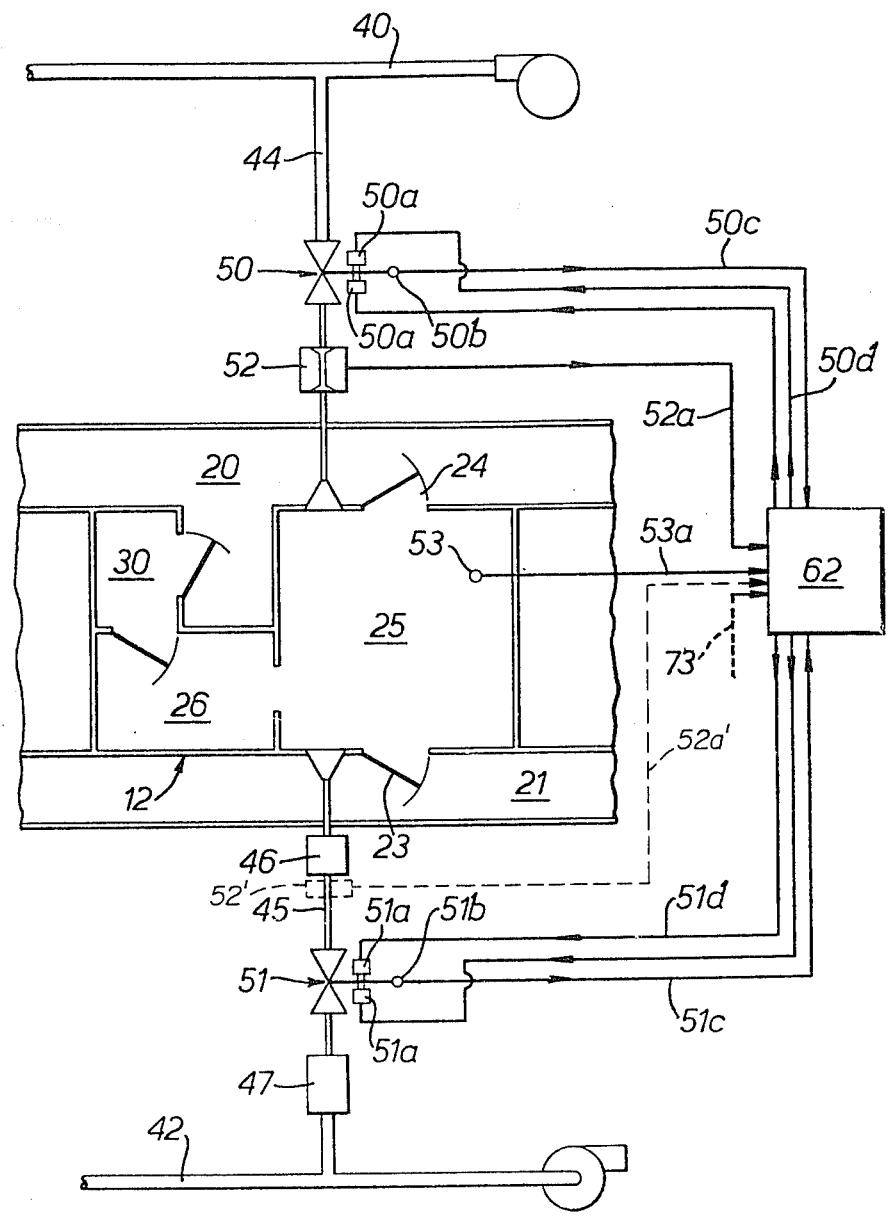

United States Patent [19]

Crittenden et al.

[11] Patent Number: 4,485,729
[45] Date of Patent: Dec. 4, 1984

[54] CONTROL OF THE ATMOSPHERE IN AN ENCLOSURE

[75] Inventors: Mark D. Crittenden, Geelong; Graeme J. Lowe, Sunshine; Neil S. McLaren, Highton, all of Australia

[73] Assignee: Commonwealth of Australia, Melbourne, Australia

[21] Appl. No.: 576,159

[22] Filed: Feb. 2, 1984

Related U.S. Application Data

[63] Continuation of Ser. No. 280,014, Jun. 18, 1981, abandoned.

[30] Foreign Application Priority Data

Nov. 9, 1979 [AU] Australia ............... PE1279

[51] Int. Cl.³ .............................. F24F 11/04
[52] U.S. Cl. ....................... 98/1.5; 98/33 R
[58] Field of Search ............. 98/1.5, 32, 33 R, 115 R, 98/115 LH; 137/78.5, 81.1

[56] References Cited

U.S. PATENT DOCUMENTS 3,078,778  2/1963  Best ..................................... 98/1.5
3,107,974 10/1963  Potapenko ........................ 98/1.5 X Primary Examiner—Harold Joyce

[57] ABSTRACT

A method of controlling an atmosphere in an enclosure (12) to which gas (40) is being supplied comprises the steps of monitoring (53) atmospheric pressure within the enclosure and the rate of gas flow to (52) or from the enclosure, comparing these parameters (62) with adjustable set points to obtain error values and adjusting inflow (50) and exhaust (51) valves for the enclosure in dependence upon the error values. A preferred method includes the intermediate steps of deriving from the error values, target positions for the valves. Also disclosed is an installation incorporating a control system for carrying out the method.

13 Claims, 2 Drawing Figures

CONTROL OF THE ATMOSPHERE IN AN ENCLOSURE

This is a continuation of co-pending application Ser. No. 280,014, filed June 18, 1981 abandoned.

This invention relates to the control of an atmosphere in an enclosure to which gas such as air is being supplied, and has particular though by no means exclusive application to the microbiologically isolated rooms of biological research establishments.

Under normal operating conditions, a barrier against escape of virus from a biological laboratory is created by the maintenance of a series of negative pressure differentials across each of the building's physical barriers. Since the negative pressure is relatively small, it is important that any technique and equipment for monitoring and maintaining the negative pressure barrier be highly sensitive to pressure variation and be capable of effective corrective response. Since a throughflow of air will normally be required, a satisfactory control system must be able to monitor and correlate both pressure and flow and yet preferably be susceptible to modification to take account of external effects such as the opening of doors to and from the protected room, changes in the characteristics of filters employed to treat the incoming or outgoing air, and the injection of air from other sources. Such sources might include a door to the enclosure which is not airtight.

Prior control systems have included separate control of exhaust airflow and intake airflow in respective dependence upon throughflow and pressure set points, control of throughflow in dependence upon a differencing of intake and exhaust flow rates, and accurate control of pressure only with throughflow merely maintained at a non-zero level.

It is an object of this invention to provide an improved method for controlling an atmosphere in an enclosure, and an installation incorporating apparatus for performing the method.

The invention accordingly provides a method of controlling an atmosphere in an enclosure to which gas is being supplied, monitoring two parameters, being atmospheric pressure within the enclosure and the rate of gas flow to or from the enclosure;

comparing the monitored values of these parameters with respective adjustable set points to obtain pressure rate of flow error values; and determining respective adjustments of gas inflow and exhaust valves for the enclosure, each in dependence upon both of said error values, and if necessary, effecting said adjustments of the valves, preferably including deriving, from said error values in accordance with pre-determined functions, target values for the positions of the gas inflow and exhaust valves.

Advantageously, said valves are selected to exhibit substantially identical dependence of rate of flow on valve position and preferably also to exhibit similar authority in the supply and exhaust configurations; and said functions include terms contributing to adjustment of the gas inflow and exhaust valves in the same direction in similar proportion to the rate of flow error value, and in opposite directions in similar proportion to the pressure variation value.

The two parameters are preferably pressure within the enclosure and the rate of gas flow into the enclosure; said flow error value is then an inflow error value. In order to enhance the dominance of the pressure error, a modified flow error value may be obtained for said deriving step by reducing the magnitude of said flow error value in proportion to the magnitude of the pressure error value.

The invention also provides an installation including a controlled atmosphere enclosure, gas inflow and exhaust valves for the enclosure, and a control system comprising:

means to monitor two parameters, being atmospheric pressure within the enclosure and the rate of gas flow to or from the enclosure, and to output respective first signals representative of the monitored values of the parameters;

means connected to receive said first signals to compare the monitored values of said parameters with respective adjustable set points to obtain pressure and rate of flow error values;

means to determine respective adjustments of said gas inflow and exhaust valves each in dependence upon both of said error values and means to effect said adjustments of the valves.

Preferably, the control system also includes means to derive from said error values in accordance with predetermined functions target values for the positions of said gas inflow and exhaust valves, to which deriving means said adjustment means is responsive.

Said enclosure would normally include doorways and the like for various categories of admission to the enclosure. Advantageously, said control system includes means for suspending active control under known uncontrollable conditions such as the opening of a doorway to the enclosure.

The comparing and deriving means preferably comprise a suitably programmed microprocessor coupled to receive said first signals and to output command signals for said valves via suitable interfacing.

Figure 2:
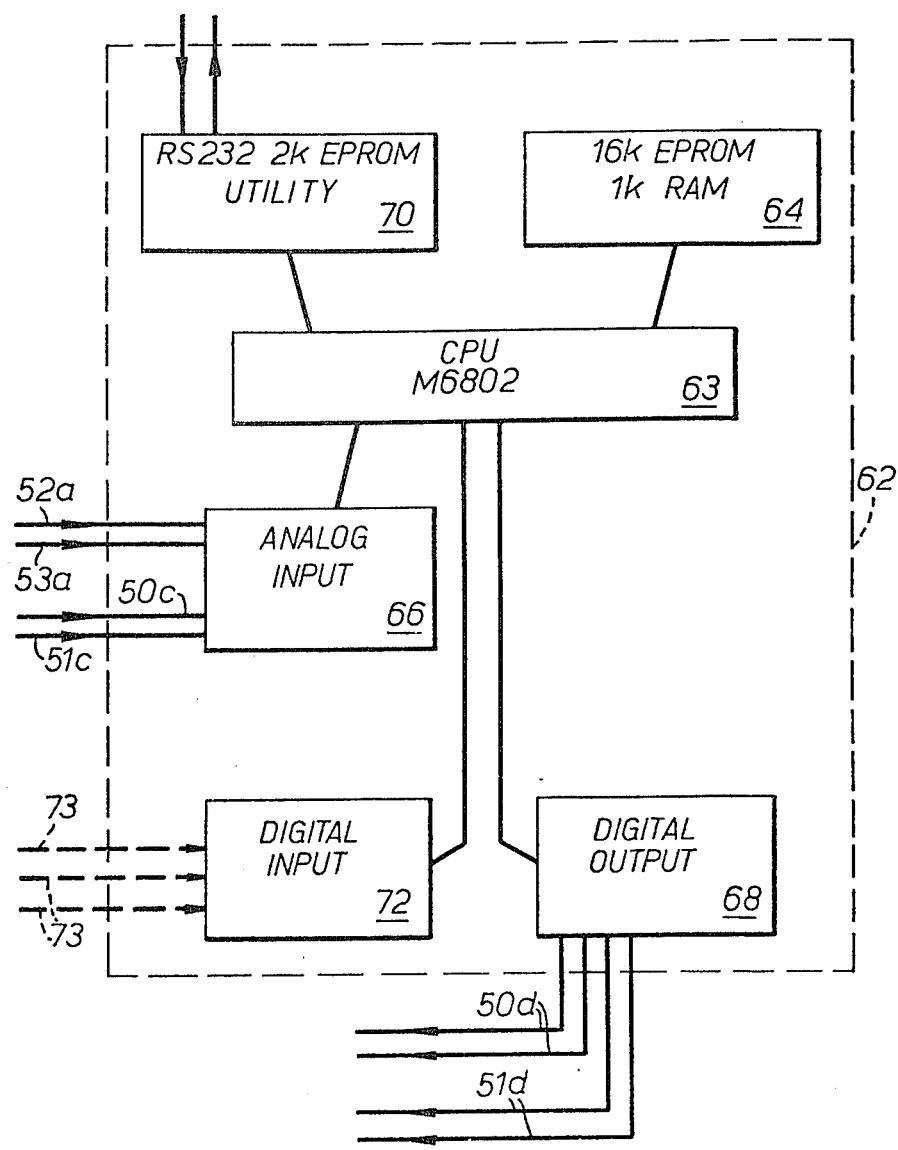

The invention will be further described, by way of example, only, with reference to the accompanying drawings, in which:

FIG. 1 is a schematic diagram showing the principal physical components of an atmosphere control system for an animal laboratory enclosure requiring microbiological security; and FIG. 2 is a diagram of the hardware components of the microprocessor controller forming part of the control system in FIG. 1.

The enclosure 12 depicted in floor plan in FIG. 1 is a self-contained animal experimentation facility and includes two or more interconnecting rooms such as rooms 25, 26. Typically, enclosure 12 is one of several in a laboratory installation. Personnel normally enter and leave the smaller rooms 26 by way of individual air locks 30 which are fitted with decontamination facilities including showers and which open into corridor 20, the "clean" corridor. Animal servicing is by way of corridor 21, the "dirty" corridor, through airtight doorways 23. Animals are normally introduced from the clean corridor and removed to the dirty corridor. Direct access from corridors 20, into enclosure 12 is provided for by doorway 24, which is substantially airtight when closed.

In order to maintain microbiological security within the illustrated enclosure, the atmosphere in the enclosure is maintained at a small negative pressure, typically about 10 mm (100 pascals) water gauge. Since the enclosure is intended to house animals and, at times, human personnel, it is essential, in addition to maintaining negative pressure, to sustain a defined flow of air through the enclosure.

FIG. 1 further indicates a primary air supply line 40 and primary air exhaust line 42 communicating with enclosure 12 by way of individual branch ducts 44, 45. Branch ducts 44, 45 are fitted with respective butterfly control valves 50, 51 which are operated in accordance with the invention by a controller 62 individual to the enclosure. Exhaust duct 45 carries successive filters 46, 47; duct 44 may also have filters.

The basic control problem is to maintain, accurately, a comparatively small negative pressure in the isolated enclosure while still providing a defined flow of air therethrough. The pressure deficit proposed is, as mentioned, typically of the order of 10 mm (100 pascals) water gauge and the rate of desired airflow through the enclosure is such that if the exhaust valve 51 was fully closed with the inlet valve 50 remaining full open, the pressure in the enclosure would change at a rate of the order of 250 to 500 pascals per second.

The control principle of the invention entails monitoring both enclosure pressure and a rate of air flow and controlling both the inflow and exhaust valves 50, 51. According to the preferred approach, the rate of flow monitored is the rate of air inflow to the enclosure. It is considered preferable for the method to be achieved by total decentralization of control into individual units for each enclosure of a laboratory, in order to minimise the consequences of any failure.

Reverting to FIG. 1, air supply line 44 is further fitted with a rate of airflow meter 52, while a fast response pressure monitor 53 is sensitive to the atmospheric pressure within enclosure 10.

Analogue signals from airflow meter 52 and pressure monitor 53 are fed on lines 52a, 53a to controller 62, the outputs of which are command signals applied to valves 50, 51 on lines 50d, 51d. Controller 62 is a flexible programmable microprocessor-based controller, the hardware for which consists of small cards each providing limited functions and plugging into a universal backplane to permit card-replacement maintenance procedures. As indicated in FIG. 2, the cards include a MOTOROLA (TradeMark) M6802 C.P.U. 63, a memory card 64 with a capacity for 16k bytes of EPROM (as 2716s) and 1k byte of RAM with selectable address, an analog input card 66 to which, inter alia, the signals generated by flow meter 52 and pressure monitor 53 are fed on lines 52a, 53a, a digital output card 68 interfacing to the valves 50, 51, a utility card 70, and a digital input card 72, the purpose of which will be discussed shortly.

C.P.U. card 63 includes a fully buffered M6802 together with crystal clock, restart hardware, first level address decoding, and 128 bytes of on-chip RAM. Utility card 70 includes enhancement items such as a "watchdog timer" circuit to ensure valid activity of software execution and an interface for use with a hand terminal.

The operational steps performed by controller 62 under program direction, will now be described. As mentioned, the continuous analog pressure and inflow signals from meters 52, 53 are passed to C.P.U. 63 via analog input card 66. Corresponding digital values are compared with respective set points adjustable in RAM to obtain respective pressure and rate of flow error values. Since the pressure requirement is foremost, it is preferable for its correction to be dominant while a pressure error exists. Accordingly, the effect of a flow error is reduced in proportion to the magnitude of the pressure error by dividing the inflow error value by the pressure error value.

The next step is the determination of inflow and exhaust valve target values as control parameters. The algorithms or functions involved are essentially of the form $$T_1 = I_1 + AP_E + BF_E + P(P_E) + D(P_E)$$

$$T_2 = I_2 - AP_E + BF_E - P(P_E) - D(P_E)$$

where $T_1$ is the inflow valve target value
$T_2$ is the exhaust valve target value
$I_1$ and $I_2$ are the present integral values of the respective values
$P_E$ is the pressure error
$F_E$ is the rate of flow error
$P(P_E)$ is a proportional function of $P_E$
$D(P_E)$ is a derivative function of $P_E$, and
A,B are scaling constants.

The respective functions and constants are predetermined empirically for the system at hand and take account of non-linearities in the various parts of the system. In the microprocessor software, the $T_1$ and $T_2$ algorithms employ a stack structured table for storage of all constants and historical data.

These algorithms are employed on the basis that the two valves exhibit substantially identical dependence of rate of flow on valve position. Moreover, the valves are desirably selected to exhibit similar authority in the supply and exhaust configurations. It will be noted that the algorithms exclude $P(F_E)$ and $D(F_E)$ terms in order to enhance the dominance of pressure correction, and that they include terms contributing to adjustment of the valves in the same direction in similar proportion to $F_E$, and in opposite directions in similar proportion to $P_E$.

As mentioned, instead of monitoring rate of airflow, it is satisfactory to monitor rate of air outflow from the enclosure. In this case, an airflow meter 52' may be provided in the duct 45, coupled to controller 62 by line 52a'. Different controller algorithms are of course required, but the principle of control is in substance the same.

Each valve 50, 51 comprises a butterfly flap, a pair 50a, 51a of ON/OFF solenoid actuators for effecting respectively the opening and closing movements of the flap and an angularly sensitive potentiometer 50b, 51b, coupled to the valve stem and arranged to output on lines 50c, 51c a signal indicative of the angular position of the flap. The solenoids are controlled by C.P.U. card 62 by command signals on line pairs 50d, 51d, in response to a comparison between the target signals and the output of angularly sensitive potentiometer 50b, 51b fed back on lines 50c, 51c to analog input card 66. This manner of controlling the valves is preferred over direct analog control because of the enhanced speed of response obtained.

In certain externally applied circumstances, it will be desirable to modify the control output of unit 62. Such circumstances will include the opening of direct doors 23, 24 to one or both corridors, a general shut down of the enclosure, changes in the characteristics of filter 46, 47 or the injection of air from other sources. This is done by rendering the set points responsive to digital inputs on line 73 to card 72 which advise impending or exhisting alteration to the external status of the closure. In this way, both the flow and pressure set points can be ramped between specific values on request from external inputs, thus, for example, enabling the room to be shut down (airflow reduced to zero) in an orderly manner or the pressure between the room and a corridor to be equalized prior to opening the direct door between these areas. In some circumstances, the controller's operation may be partially or wholly suspended on external request. Input signals to digital input card 72 may originate, e.g. from manual switches or door operated microswitches.

In accordance with a preferred aspect of the invention the response of the control unit to pressure and flow error values is provided with certain dead bands selected to smooth fluctuations and to reduce the frequency of operation of the valves. More particularly, the controller may be programmed in EPROM to compare the two error values with respective limits variable in RAM and to set the error values at zero where the read error values are within a respective lesser limit as the error value is reducing or a greater limit as the error value is increasing.

In a further preferment, an upper limit may be set on the integral components of the aforementioned functions for the derivation of the target values. This may be desirable to prevent integral wind-up, especially under certain start-up conditions such as one inoperative fan. Such an integral upper limit, $I_{UL}$, may be determined by the C.P.U. on a sliding scale according to the function;

$$I_{UL} = V + aF$$

where V and a are constants and F is the actual flow value.

It is found that the inventive combination of method steps, and the installation incorporating a control system for performing the steps, affords a highly satisfactory solution to the problem of accurately and reliably maintaining a small negative pressure in a microbiological security enclosure while sustaining a defined flow of air through the enclosure. The preferred opposite adjustment of the inflow and exhaust valves for a pressure variation permits fast response in the adjustment of the pressure in the enclosure. The detection of a difference, which may be very small, is avoided, as indeed is dependence for control on the very existence of a difference.

We claim:

1. A method of controlling an atmosphere in an enclosure to which gas is being supplied, comprising:
   monitoring two parameters, being atmospheric pressure within the enclosure and the rate of gas flow to or from the enclosure and conveying monitored values obtained thereby to a control means;
   comparing at the control means the monitored values of these parameters with respective adjustable set points to obtain pressure and rate of flow error values;
   determining respective adjustments of gas inflow and exhaust valves for the enclosure, each in dependence upon both of said error values, if necessary, effecting said adjustments of the valves to said adjustable set points.

2. A method according to claim 1, wherein said-determining includes:
   deriving, from both of said error values in accordance with pre-determined functions, target values for the positions of gas inflow and exhaust valves for the enclosure.

3. A method according to claim 2, wherein said valves are selected to exhibit substantially identical dependence of rate of flow on valve position and also to exhibit similar authority in the supply and exhaust configurations; and said functions include terms contributing to said adjustments of the gas inflow and exhaust valves in the same direction in similar proportion to the rate of flow error value, and in opposite directions in similar proportion to the pressure variation value.

4. A method according to claim 3 wherein said predetermined functions are essentially of the form of $$T_1 = I_1 + AP_E + BF_E + P(P_E) + D(P_E)$$

$$T_2 = I_2 - AP_E + BF_E - P(P_E) - D(P_E)$$

where
   $T_1$ is the inflow valve target value
   $T_2$ is the exhaust valve target value
   $I_1$ and $I_2$ are the present integral values of the respective values
   $P_E$ is the pressure error
   $F_E$ is the rate of flow error
   $P(P_E)$ is a proportional function of $P_E$
   $D(P_E)$ is a derivative function of $P_E$, and
   A,B are scaling constants.

5. A method according to claim 1, wherein the two parameters monitored are pressure within the enclosure and the rate of gas flow into the enclosure, and (in that) said rate of flow error value is an inflow error value.

6. A method according to claim 1, including obtaining a modified flow error value by reducing the magnitude of said rate of flow error value in proportion to the magnitude of the pressure error value.

7. A method according to claim 1, including comparing said error values with predetermined respective limits selected to smooth fluctuations and to reduce the frequency of operation of the valves.

8. A method according to claim 2 wherein the valves are adjusted by controlling solenoids of the valves in dependence upon a comparison of the target values and fed back signals indicative of the positions of the respective valves.

9. An installation including a controlled atmosphere enclosure, gas inflow and exhaust valves for the enclosure, and a control system comprising:
   means to monitor two parameters, being atmospheric pressure within the enclosure and the rate of gas flow to or from the enclosure, and to output respective first signals representative of the monitored values of the parameters;
   means connected to receive said first signals to compare the monitored values of said parameters with respective adjustable set points to obtain pressure and rate of flow error values;
   means to determine respective adjustments of said gas inflow and exhaust valves, each in dependence upon both of said error values; and
   means to effect said adjustment of the valves.

10. An installation according to claim 9 wherein said determining means includes
   means to derive, from both of said error values in accordance with pre-determined functions, target values for the positions of said gas inflow and exhaust valves.

11. An installation according to claim 10 wherein said valves are selected to exhibit substantially identical dependence of rate of flow on valve position and also to exhibit similar authority in the supply and exhaust configurations; and said functions include terms contributing to said adjustments of the gas inflow and exhaust valves in the same direction in similar proportion to the rate of flow error value, and in opposite directions in similar proportion to the pressure variation value.

12. An installation according to claim 9 wherein said means for effecting said adjustments includes a respective pair of solenoids for opening and closing each valve, means arranged to produce a signal indicative of the position of each valve, and second comparing means for controlling the solenoids in dependence upon a comparison of the respective valve position signals and the adjustment required on the basis of said target values.

13. An installation according to claim 9 wherein said comparing, determining and deriving means comprise a suitably programmed microprocessor coupled to receive said first signals and to output command signals for said valves via suitable interfacing.

* * * * *